G. W. ROOT.
Cooking Apparatus.
No. 150,191. Patented April 28, 1874.
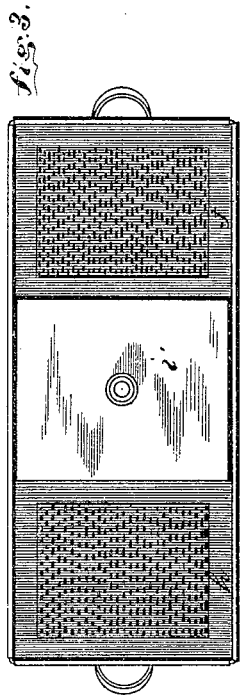
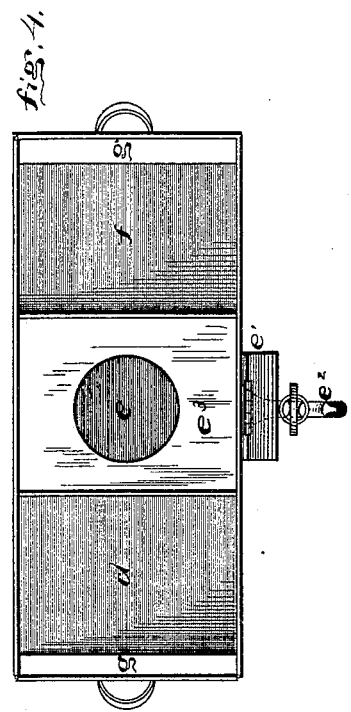
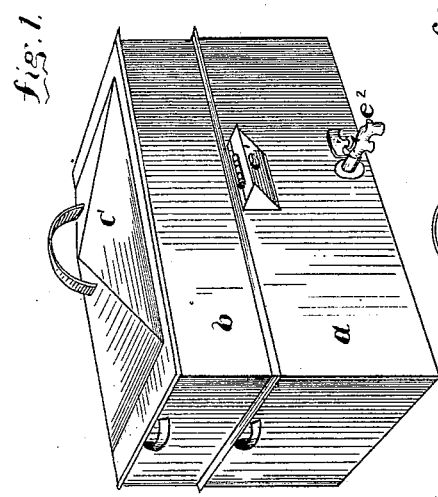
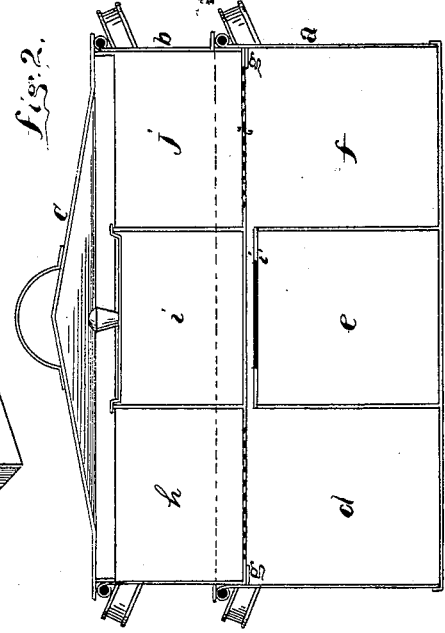
Witnesses.
John Pollitt
Hugh O'Flaherty
Inventor
George W. Root
By W. E. Simonds
Att

UNITED STATES PATENT OFFICE.

GEORGE W. ROOT, OF HARTFORD, CONNECTICUT.

IMPROVEMENT IN COOKING APPARATUS.

Specification forming part of Letters Patent No. 150,191, dated April 28, 1874; application filed January 12, 1874.

*To all whom it may concern:*

Be it known that I, GEORGE W. ROOT, of Hartford, in the county of Hartford and State of Connecticut, have invented certain new and useful Improvements in Cooking Apparatus, of which the following is a specification, reference being had to the accompanying drawings, where—

Figure 1 is a perspective view of the exterior of my improved cooker. Figure 2 is a central vertical longitudinal section of the same. Fig. 3 is a top view of the upper section of the cooker with the cover removed. Fig. 4 is a top view of the lower section of the cooker, the upper section removed.

The invention is a device for cooking edibles by hot water or steam. The invention consists in such combination and arrangement of the parts as to constitute a handy and effective apparatus.

The cooker is made in two sections, $a$ and $b$, with a cover, $c$, which serves equally well as a cover for either of the sections $a$ or $b$. The lower section has three compartments, $d\ e\ f$. The two outer ones, $d f$, are intended for boiling purposes. The central one, $e$, is a hot-water compartment, intended for heating water, with a nose, $e^1$, by which it may be filled when the lower section is covered, and a faucet, $e^2$, whereby to draw off the water. By preference a stationary cover, $e^3$, is given to this hot-water compartment, having a central hole to give access. The upper section sits into the top of the lower section, resting on the shoulders $g\ g$. This upper section has three compartments, $h\ i\ j$, answering in position to the compartments in the lower section. The bottoms of the two outer compartments are pierced with strainer-like holes, so that the steam can rise from the compartments beneath them, $d$ and $f$, into the compartments $h$ and $j$, so that articles can be steamed in these latter compartments. The compartment $i$ has a cover, $i'$, so that it can be closed up. Articles, after having been cooked in other compartments, can be placed in this and kept hot, or they can be slowly cooked in this compartment. This compartment is very useful for cooking vegetables which have strong odors, like cabbage or onions, they being prevented thereby from flavoring the food in the other compartments.

When simple boiling of food is desired, the upper section can be dispensed with and the cover $c$ placed on the lower section.

It will be seen from this description that this is a very useful household article. Two different kinds of food can be boiled in the compartments $d\ f$, water heated in the compartment $e$, two different kinds of food cooked by steam in the compartments $h$ and $j$, and still another kind of food heated or cooked in the compartment $i$, and all at the same time.

I claim as my invention—

A cooker made in separable sections $a\ b$, the former having the water-compartments $d\ e\ f$, the central one provided with the filler $e^1$ and faucet $e^2$, and the latter having the strainer-bottomed compartments $h\ j$, and the central close-bottomed compartment $i$ with cover, all constructed, arranged, and designed for use as shown and described.

G. W. ROOT.

Witnesses:
 WM. EDGAR SIMONDS,
 JOHN POLLITT.